2 Sheets--Sheet 1.
D. PETERS.
Meat-Choppers.
No. 6,237. Reissued Jan. 19, 1875.
FIG. I.
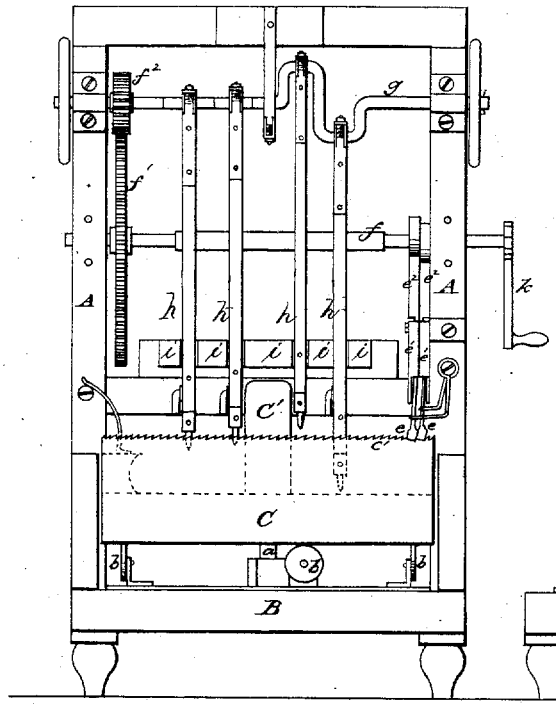
FIG. III.
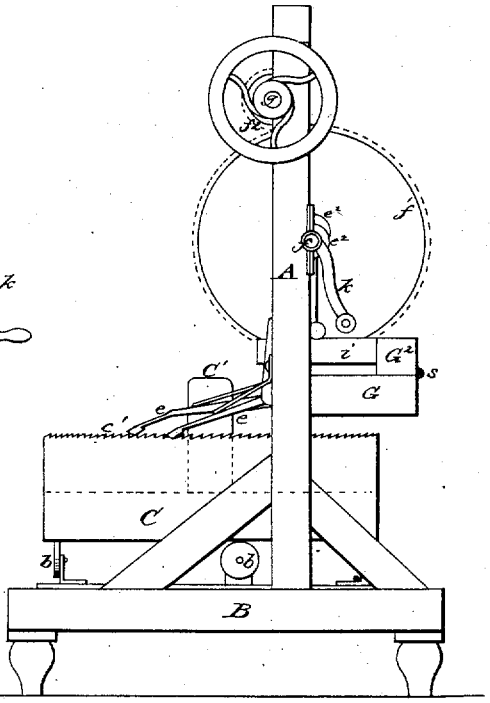
FIG. II.
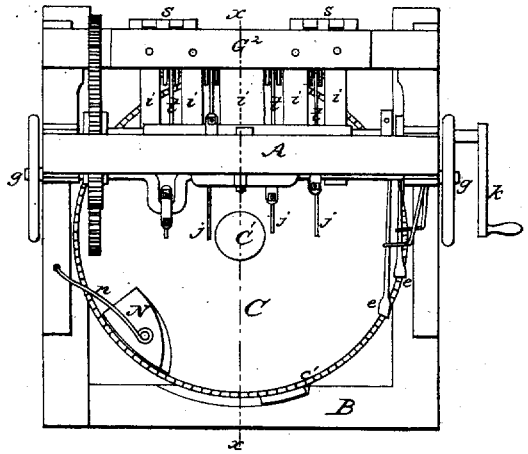
FIG. IV.
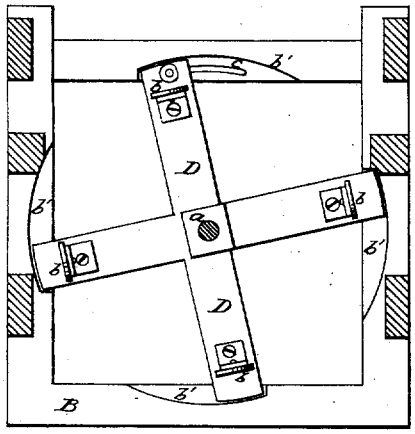
WITNESSES:
A. McCallum
D. G. Stuart
INVENTOR:
Daniel Peters,
By W. B. Richards,
Atty.
THE GRAPHIC CO. PHOTO-LITH. 39 & 41 PARK PLACE, N.Y.

2 Sheets--Sheet 2.
D. PETERS.
Meat-Choppers.
No. 6,237. Reissued Jan. 19, 1875.
FIG. V.
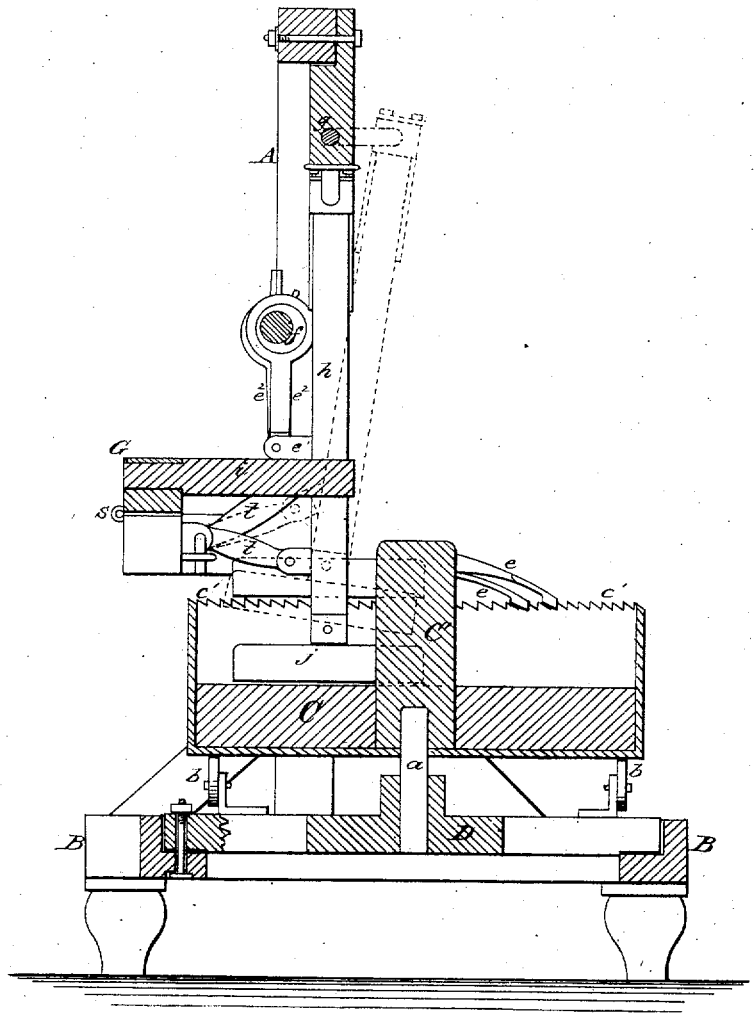
WITNESSES:
A. McCallum
D. G. Stuart
INVENTOR:
Daniel Peters,
By W. B. Richards,
Atty.
THE GRAPHIC CO. PHOTO-LITH. 39 & 41 PARK PLACE, N.Y.

UNITED STATES PATENT OFFICE.

DANIEL PETERS, OF BURLINGTON, IOWA, ASSIGNOR, BY MESNE ASSIGNMENTS, TO HIMSELF AND MURRAY IRON-WORKS COMPANY.

IMPROVEMENT IN MEAT-CHOPPERS.

Specification forming part of Letters Patent No. 123,725, dated February 13, 1872; reissue No. 6,237, dated January 19, 1875; application filed January 2, 1875.

DIVISION B.

*To all whom it may concern:*

Be it known that I, DANIEL PETERS, of Burlington, county of Des Moines and State of Iowa, have invented certain Improvements in Meat-Choppers; and I do hereby declare that the following is a full, clear, and exact description of the construction and operation of the same, reference being had to the annexed drawings, making a part of this specification, and to the letters and figures of reference marked thereon.

Figure 1, Plate 1, is a front elevation of a machine embodying my invention. Fig. 2, Plate 1, is a top view. Fig. 3, Plate 1, is a side elevation. Fig. 4, Plate 1, is a top view of the base of the machine. Fig. 5, Plate 2, is a sectional view on the line *x x* in Fig. 2.

Similar letters of reference indicate corresponding parts in all of the figures.

This invention relates to improvements in machines for chopping meat, wherein are employed an adjustable intermittently-rotating chopping-block, a series of knives, which are operated by cranks, and also a scraper, which will direct the material inwardly from the circumference of the chopping-block, so as to be constantly brought beneath the chopping-blades, as hereinafter fully described.

The following description of my invention will enable those skilled in the art to make and use it.

Referring to the drawing by letters, letter A represents an upright frame, of rectangular form, which is erected upon a quadrangular base, B. The inner upper edges of the bars composing this base B have inclined depressions *b'* formed into them, on the inclines of which the ends of four arms of a cross-frame, D, rest, so that by turning the latter about its center it will rise or descend.

By means of a bolt which is passed through one of the arms, and also through a curved slot, *c*, the frame D can be fixed rigidly to its frame B after it is properly adjusted.

Near the extremities of the arms of frame D are anti-friction-wheels *b*, on which is supported a cylindrical chopping-block, C, which is fitted into a metallic shell having ratchet-teeth *c'* formed on its upper horizontal edge. The center-pin *a* of the block C is received into a hub formed in the center of the cruciform frame D, and directly above this pin *a* a center-post, C', of cylindrical form, rises from the chopping-surface of the block, so as to prevent the accumulation of meat in the center of the block, where it would be out of the way of the cutters or choppers *j*. N represents a beveled and tapering clearer or plow, which lies closely in the curve formed by the block C and that portion of its shell which rises above its surface, and which is held in its place by a rod, *n*, fastened to one of the uprights of the frame A. This plow scrapes the meat from the extreme circumference of the block, and directs it beneath the choppers *j*. Above the chopping-block, and having its bearings in the uprights of the frame A, is a driving-shaft, *f*, on the extreme outer end of which is a crank, *k*. There are two eccentrics keyed on the shaft, which communicate alternate backward and forward movements to two pawls, *e e*, through the medium of angle-levers $e^1$ $e^1$ and connecting-rods $e^2$ $e^2$. The free hooded ends of the pawls *e e* are held down upon the ratchet-teeth $e^1$ of the chopping-block case by springs, which are fastened to frame A.

By these means the chopping-block and its case receive together a slow intermittent rotary motion when the shaft *f* is turned, which keeps the meat on the block constantly moving beneath the choppers.

Above the shaft *f*, but on the front side of the frame A, is another shaft, *g*, which receives motion from shaft *f* through a large spur-wheel, $f^1$, and a pinion, $f^2$. This shaft *g* has four cranks formed on it, corresponding to the four chopping-knives *j*, and to each crank a connecting-rod or handle, *h*, is attached by a journal-box and straps. Each handle passes between the bars of a hinged rack, *i*, and below this rack each handle is connected by a link, *t*, to a frame, G, as shown in Fig. 5. The rack *i* is composed of a number of parallel bars secured to a bar, $G^2$, which is hinged at *s s* to the frame G.

The bars of this rack serve as guides for the handles *h* of the choppers, and prevent their displacement laterally. The hinging of the rack allows it to be thrown back when access below it is desired.

It will be seen that the chopping-block and its case can be readily adjusted up to the knives by simply turning the frame D as the block is worn away.

What I claim as new, and desire to secure by Letters Patent, is—

1. The hinged guide bars or rack *i*, arranged to operate with the choppers *h j*, substantially as described, and for the purpose specified.

2. The combination of the frame D, adjustable vertically in the manner described, chopping-block C, and choppers *h j*, arranged and operating as set forth.

3. The plow N *n*, constructed and operating as described, in combination with the choppers *h j*, chopping-block C, and post C′, arranged and operating substantially as described.

4. The combination of the set of pawls *e e*, rods $e^2$ $e^2$, on the rim of the cylinder of chopping-block C, eccentrics of shaft *f*, and the choppers *h j*, arranged and operating as described.

DANIEL PETERS.

Witnesses:
DAVID W. GRIMES,
E. SLOSSON.